Jan. 13, 1925.
H. D. TAYLOR
1,522,986
INDICATING INSTRUMENT
Filed July 21, 1924
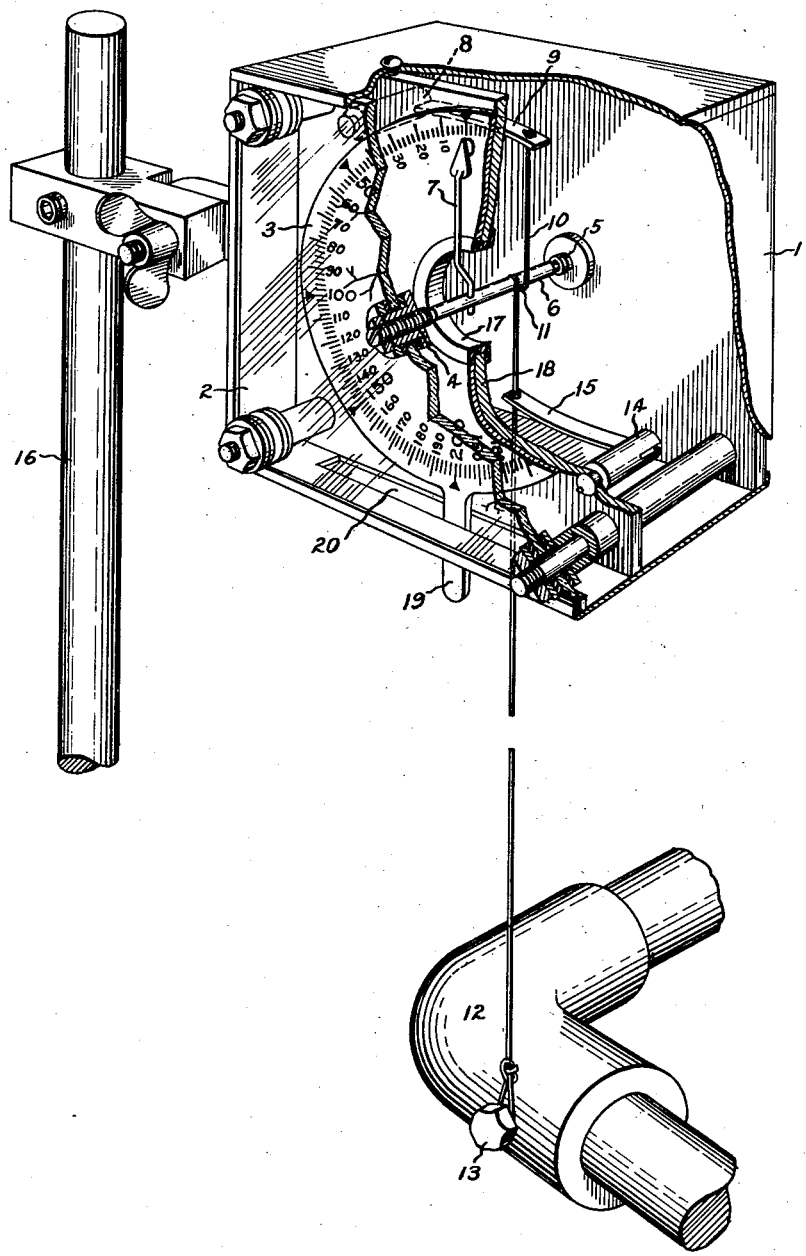
Inventor
Hamilton D. Taylor
by
His Attorney Patented Jan. 13, 1925.

1,522,986

UNITED STATES PATENT OFFICE.

HAMILTON D. TAYLOR, OF SCHENECTADY, NEW YORK, ASSIGNOR TO GENERAL ELECTRIC COMPANY, A CORPORATION OF NEW YORK.

INDICATING INSTRUMENT.

Application filed July 21, 1924. Serial No. 727,133.

*To all whom it may concern:*

Be it known that I, HAMILTON D. TAYLOR, a citizen of the United States, residing at Schenectady, in the county of Schenectady, State of New York, have invented certain new and useful Improvements in Indicating Instruments, of which the following is a specification.

The present invention relates to indicating instruments, and especially to indicating instruments for use in measuring small, rapid movements such as, for example, vibrations.

An application of my invention is in connection with balancing machines for indicating the presence of and the amplitude of vibrations due to a body being balanced. With such machines it becomes particularly important that there be practically no friction in the indicating instrument for the calculations for the balancing are based on the amplitude of the vibrations set up, and if friction is present in the indicating instrument then the direct proportionality between the degree of unbalance and the indicator reading is destroyed.

The object of my invention is to provide an improved indicating instrument which is sensative, practically free from friction, and capable of permitting movement of the pointer over a long range, and for a consideration of what I believe to be novel and my invention, attention is directed to the accompanying description and the claims appended thereto.

In the drawing, the figure is a perspective view, with parts broken away, of an indicating instrument embodying my invention.

Referring to the drawing, 1 indicates a casing provided with a glazed front 2 behind which is a scale plate 3. Supported in the front and rear walls of casing 1 are jeweled bearings 4 and 5 in which is pivoted a shaft 6 provided with a pointer 7 which moves over scale plate 3. In the top of the casing is a post 8 to which is attached one end of a spring 9, the other end being free and standing vertically over shaft 6. Connected to the free end of spring 9 is a thread 10 which is wrapped once around shaft 6 as is indicated at 11 and is adapted to have its lower end connected to a member the vibration of which is to be measured. In the drawing, 12 indicates a vibrating part of a balancing machine and it is provided with a projection 13 to which the end of thread 10 is attached. In casing 1 below shaft 6 is a second post 14 to which is attached one end of a spring 15 the other end being attached to the thread 10. The instrument is shown as being adjustably supported on a post or standard 16. Springs 9 and 15 are very light and are arranged to oppose each other so that they serve to hold pointer 7 in a definite position.

With the above described arrangement when part or member 12 vibrates it alternately pulls down upon and releases thread 10, the springs moving with the member and keeping the thread taut. The movements of the thread serve to oscillate shaft 6 and move pointer 7 over the scale plate.

Preferably the scale plate is made adjustable circumferentially and to this end it is shown as being mounted on a hub 17 carried by a wall 18 and as being provided with a handle 19 which projects through a slot 20 in the lower side wall of the casing.

In using the instrument, thread 10 is attached to member 13, the spring 9 being put under a small amount of tension, and the thread being attached so that pointer 7 stands at or about zero. The scale plate is then turned by means of handle 19 to bring the zero point under the pointer. Now, when member 12 vibrates, the movements of the thread will oscillate shaft 6 and move pointer 7 back and forth over the scale, the pointer moving from one side of the zero point to the other. The extent of the movements of the pointer indicates the amplitude of the vibration.

With the above described arrangement, it will be clear that when member 12 is vibrating, spring 9 always pulls up on the shaft an amount equal to the down pull on it due to the pull on the thread and the pull of spring 15. As a result, no load is put on shaft 6 or its bearings by the down pull on the thread, i. e., there is no spring load on the shaft, so that the arrangement gives a practically frictionless support for the shaft in its bearings, the bearings being required to support only the weight of the shaft and the pointer, which may be made very light in weight. The arrangement has the advantage also that the pointer can turn freely in either direction so that it may oscillate a complete revolution or more in case vibrations of comparatively great amplitude are met with. At the same time, however, it retains the same degree of sensitiveness. The lower spring 15 serves to keep the thread taut on shaft 6 when the thread is not attached to a vibrating member.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In an indicating instrument, the combination of spaced supports, bearings in said supports, a shaft journaled in said bearings, a spring located above the shaft, a thread attached to said spring and wrapped around the shaft, and means for indicating the extent of the movements of said shaft.

2. In an indicating instrument, the combination of spaced supports, bearings in said supports, a shaft journaled in said bearings, a flat spring attached at one end to one of said supports, the other end being free, a thread fastened to the free end of said spring and wrapped around the shaft, the other end of said thread being free for attachment to a vibrating member, and means for indicating the extent of the movements of said shaft.

3. In an indicating instrument, the combination of spaced supports, bearings in said supports, a shaft journaled in said bearings, a spring located above the shaft, a thread attached to said spring and wrapped around the shaft, the other end of said thread being free for attachment to a vibrating member, a second spring attached to said thread below the shaft for keeping the thread taut around the shaft, and means for indicating the extent of the movements of said shaft.

In witness whereof, I have hereunto set my hand this 18th day of July, 1924.

HAMILTON D. TAYLOR.